Jan. 14, 1930.  J. PRICE  1,743,568
TEMPERATURE CONTROL SYSTEM FOR DEPHLEGMATORS
Filed Aug. 14, 1926
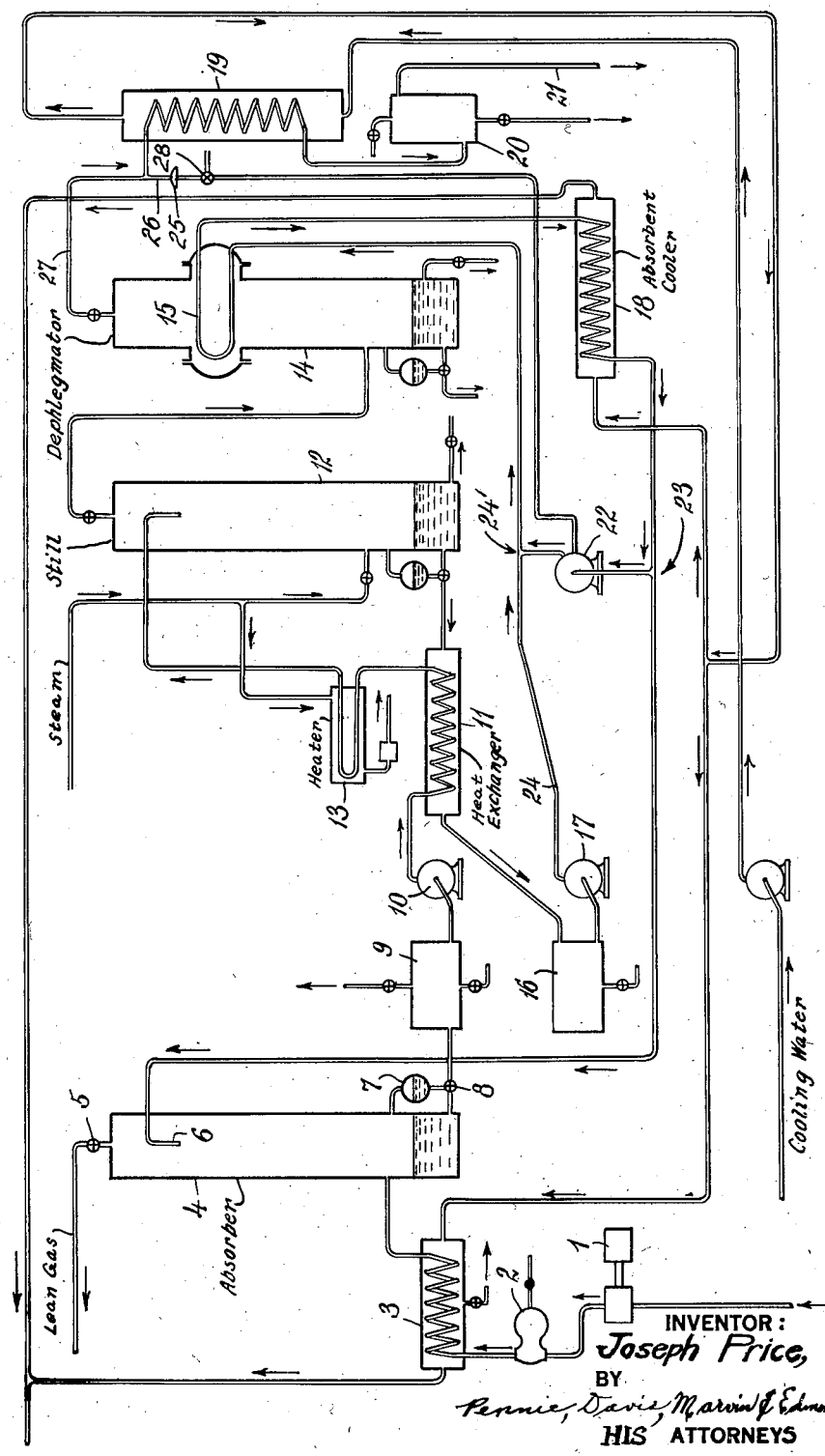
INVENTOR:
Joseph Price,
BY
Pennie, Davis, Marvin & Edmonds
HIS ATTORNEYS Patented Jan. 14, 1930

1,743,568

UNITED STATES PATENT OFFICE

JOSEPH PRICE, OF ST. GEORGE, NEW YORK, ASSIGNOR TO THE GRISCOM-RUSSELL COMPANY, OF NEW YORK, N. Y., A CORPORATION OF DELAWARE

TEMPERATURE-CONTROL SYSTEM FOR DEPHLEGMATORS

Application filed August 14, 1926. Serial No. 129,158.

This invention relates in general to gasoline recovery from natural gases or similar gas mixtures, and, in particular, to the controlling of the temperature in the dephlegmators of absorption type gasoline recovery plants.

In recovering gasoline from natural gas by the absorption process, the gas is first treated with a liquid absorbent menstruum capable of dissolving or entraining the gasoline constituents of the gas, and the other, or lean gases and the absorbent containing the gasoline are separated from each other. Afterward the absorbent charged with gasoline is treated with steam in a steam distilling operation to remove therefrom as much as is practicable of the absorbed gasoline, and the stripped absorbent is used again for treatment of additional natural gas. The mixture of gasoline vapors, steam, vapors of the absorbent menstruum, and the non-condensible gases passing from this distilling operation is then subjected to a selective or fractional condensation operation in a dephlegmator to separate therefrom the steam and the vapors of the absorbent.

Heretofore, inability to satisfactorily and simply control the dephlegmator temperature in such gasoline recovery plants without the use of precoolers and intercoolers has been accepted as inherent in such plants. Invariably, hitherto, the quantity, quality, and especially, the temperature, of the mineral seal oil used as the absorbing medium in the absorbers and as the cooling fluid in the dephlegmators of these plants, as it leaves the usual heat exchanger after passing the steam still,—no matter how efficient the latter may be,—has been found to be such that this fluid was not capable of satisfactorily absorbing all of the heat added to the system by the stripping or distilling operation, which heat must nevertheless be removed from the dephlegmator by the dephlegmator cooling tube bundles. However, in order that the plant produce satisfactorily pure gasoline, it is imperative that this heat be as nearly as possible removed, or, in other words, that the dephlegmator temperature be kept at the proper value and substantially constant.

It is a principal object of the present invention to provide a method and means for recovering gasoline by the absorption process by which the temperature of the dephlegmator is accurately and automatically controlled or regulated in such a manner that it remains substantially constant.

Another object of the present invention is to increase the scope of employment of absorption type gasoline recovery apparatus by decreasing beyond expectation its cost of construction and operation through the elimination of numerous expensive elements heretofore deemed always necessary; and also by decreasing to a marked degree the amount of cooling fluid required in the dephlegmator.

While the subject-matter of the present invention includes within its purview a simplified improved and more efficient gasoline recovery apparatus, comprising much needed automatic dephlegmator temperature control means, the broad ideas of recovering gasoline from natural gases by the absorption method, or of cooling or heating generally by recycling, are not the subject-matter of the present invention, and are therefore not described in detail herein.

According to the present invention, starting with the dephlegmator temperature at such a degree that no gasoline vapors are condensing therein, but all the other vapors are so condensing, the stripped absorbing medium, after leaving the distilling operation and passing through a heat exchanger provided to preheat the charged absorbent entering the still, is passed directly to the cooling coil of the dephlegmator, instead of first through the usual dephlegmator pre-coolers, or the like. Thus the usual pre-cooling heat exchanger is omitted and the absorbent oil is only partially cooled by the heat exchanger just mentioned. This oil may be held in a storage tank, if desired, and conveyed from storage to the cooling coil.

The absorbent medium, after leaving the cooling coil of the dephlegmator, passes through the usual final cooler and thence back to the absorber. But in accordance with the invention to control the dephlegmator temperature, a portion of this oil, after leaving the cooler is transferred or shunted and recycled through a suitable connection and pump if necessary to the dephlegmator coil, by the line already conveying absorbent to the cooling coil in the usual manner from the storage tank, where it is admixed with the partially cooled oil from the storage tank. A thermostat associated with the dephlegmator in such manner as to be responsive to the variations in temperature of the vapors in the upper portion of the dephlegmator, is operatively connected with the valve or pump that is placed in the transfer or shunt line. This thermostat by controlling the duration of operation of the pump shunting the cold absorbents controls or regulates the quantity of thoroughly cooled absorbent transferred and admixed with the partially cooled absorbent from the storage tank, thus controlling the temperature of the mixture, and hence the temperature of the cooling coil of the dephlegmator.

In this way, the temperature of the dephlegmator may be controlled by the admixture of two portions of cooling fluid, one coming from the storage tank and at a temperature above that at which it is possible to condense the steam and mineral seal vapors in the dephlegmator, and the other coming from the final oil cooler at a temperature lower than this desired temperature; and by merely varying the quantity of cooling fluid from the cooler of these two sources, an appropriate temperature and total quantity of the mixture is obtained; or if preferred both portions of the cooling fluid may be at the same temperature and still the desired temperature of the dephlegmator would be brought about by varying sufficiently the quantity of oil recirculated, as by speeding up the circulating pumps at both sources. It will be understood, however, that in accordance with the present invention, it is possible to take the larger portion of the cooling fluid used in the dephlegmator from the higher temperature source, or in other words, from the storage of partially cooled absorbent; then a lesser amount of the relatively cold absorbent admixed with the partially cooled absorbent, by increasing the speed of circulation, for example, produces the desired temperature, so that the quantity of cooling fluid required is reduced.

The invention will be further described in connection with the accompanying drawing which illustrates diagrammatically apparatus embodying the invention and adapted to carry out the method of the invention. It will be understood, however, that this typical form and further description are for the purpose of illustration and that this invention is not limited thereto. The accompanying drawing illustrates partly in elevation and partly in section an apparatus for the recovery of gasoline from natural gas, as accomplished by the present invention.

Referring now in detail to the drawing, the system of the present invention is shown as comprising a gas compressor 1 connected to a source of "rich" natural gas, which gas passes thence to a separator 2, thence to a gas cooler 3, and thence to an absorber 4, in the usual manner.

The absorber 4 is equipped in the usual manner with an outlet 5 for the lean gas; an inlet 6 for the menstruum—here the "lean oil" of the natural gas base; a level control 7, and an outlet 8 for the rich oil produced in the absorber. The path of the rich oil to be further operated upon is thence to a vent tank 9, whence it is pumped by a rich oil pump 10 through a heat exchanger 11, where it is raised in temperature by the stripped oil from a steam still 12, and thence passes through the preheater 13 and into the steam still 12, in the ordinary manner of absorption plants.

From the steam still, a mixture of steam, gasoline vapor, mineral seal-oil vapor, and non-condensed natural gas passes to a dephlegmator 14. The mixture of fluids then passes from the dephlegmator to a gasoline condenser 19, and thence the condensed gasoline vapors pass to a separator tank 20, and finally out through a run-down line 21 to storage, in the well-known way of this type of plant.

It is to be pointed out that the dephlegmator 14 has only one bundle of cooling tubes 15, instead of the two or more bundles usually required for efficient operation, and this tube bundle is cooled partly by an oil supply to be later described, and partly by being connected to a "lean oil" storage tank 16 through a pump 17. The oil leaving the tube bundle passes through the oil cooler 18, the absorber 4, the vent tank 9, pump 10, heat exchanger 11, preheater 13, and steam still 12 and back to storage 16, somewhat in the usual fashion, but does not depend entirely upon this circuit for its cooling means.

Now, if, as is usually the case in subsistent plants, the temperature of the dephlegmator 14 became too elevated, most of the steam and mineral seal-oil vapor entering the dephlegmator from the steam still 12 would not be condensed as it should be,—unless the inefficient measure of decreasing the amount of steam supplied to the still were employed— and instead would pass over with the gasoline vapors into the gasoline condenser 19. On the other hand, if the temperature were allowed to fall too low, the gasoline vapor itself would also be condensed in the dephlegmator as well as the gases intended to be condensed there, and would be lost thereby. In order to successfully accomplish, easily and accurately, the necessary control of the dephlegmator temperature, therefore, the present invention contemplates the combination with the foregoing described plant of a recirculating or recycling pump 22, which is shown in the drawing as discharging at 24' into the "lean oil" line 24 leading from pump 17, the pump 22 receiving oil from the lean oil discharge 23 from cooler 18. The pump 22 is controlled by a thermostatic valve 25, operated by the changes in temperature of the vapor leaving the dephlegmator 14 by the pipe line 27.

When operating conditions become such that the dephlegmator temperature rises, as when the operating load on the plant is increased, the rise in temperature of the vapors coming from the dephlegmator actuates the thermostat 25, which opens the steam valve 28, thus starting up the pump 22. This pump, by means of suitable piping connected as shown in the drawing, thereupon adds the necessary amount of thoroughly cooled "lean oil" at a temperature usually some 45° less than the normal temperature of the dephlegmator cooling fluid, to the line 24 and hence to the dephlegmator cooling-tube bundles 15, the flow lasting until the dephlegmator temperature is again reduced, causing the thermostat to close steam valve 28. In operation, these actions occur in such a fashion that the temperature of the dephlegmator is maintained substantially constant and is not merely intermittently controlled. This addition of relatively cool fluid very efficiently reduces the dephlegmator temperature, restoring the plant to its normal condition of being cooled by the fluid from the lean oil storage tank 16. Hence the temperature of the dephlegmator can never fall below normal far enough to condense the gasoline vapors passing therethrough from the steam still, and yet the temperature never stays above normal for a length of time sufficient to prevent the steam and the mineral seal oil vapor from condensing as they should in the dephlegmator.

The complicated and expensive dephlegmator precoolers, and intercoolers, and the multiplicity of cooling tube bundles heretofore considered necessary are completely eliminated, yet the quantity and quality of the gasoline output is not lowered thereby. Moreover, in a plant built in accordance with the present invention, cheaper construction will result, as well as simplified operation, compactness, and generally increased desirability, as well as the specific advantages afforded by automatic control of the dephlegmator temperature, and the means for maintaining the dephlegmator at a nearly constant temperature.

I claim:

1. Apparatus for dephlegmating, comprising a still for producing a mixture of vapors, a dephlegmator connected thereto and having a cooling coil, a storage tank receiving cooling medium from said still for said dephlegmator and having its inlet connected to the still and its outlet connected directly to said dephlegmator cooling coil inlet, and a cooler having its inlet connected to the outlet of said dephlegmator cooling coil, and having an outlet, a shunting conduit connected across the outlet end of said cooler and the inlet end of said dephlegmator cooling coil, and a device in said conduit responsive to changes in the temperature of said dephlegmator for controlling the temperature of said dephlegmator.

2. Apparatus for recovering gasoline from natural gas or the like by an absorbing medium, comprising separating means for separating the absorbed gasoline constituents from the absorption medium, a dephlegmator for separating gasoline vapors from other constituents, said dephlegmator having a cooling coil for condensing said other constituents, a heat exchanger for partially cooling the separated absorbing medium coming from the first mentioned separating means, cooling means for cooling the absorbing medium after it leaves the cooling coil of the dephlegmator, recycling means for admixing a portion of said cooled absorbing medium with the partially cooled medium from the heat exchanger, a conduit for conveying the mixture to the cooling coil, a thermostat connected to the dephlegmator vapor outlet and connecting means between the thermostat and the recycling means whereby the amount of cooled absorbent admitted into the dephlegmator coil from the second cooling means is automatically regulated and the temperature of the heating coil of the dephlegmator controlled.

3. Apparatus for recovering gasoline from natural gas or the like by an absorption medium, comprising separating means for separating absorbed gasoline constituents from the absorption medium, a dephlegmator for separating gasoline vapors from other constituents, said dephlegmator having a cooling coil for condensing the said other constituents, a heat exchanger for partially cooling the separated absorbing medium coming from the first mentioned separating means, a pump having connections to a reservoir for conveying the partially cooled absorbing medium from this heat exchanger to the cooling coil of the dephlegmator, cooling means for cooling the absorbing medium after it leaves the dephlegmator cooling coil, a line for conveying the excess portion of the cooled medium back into circulation in said system, a second pump and connections therefor for conveying the other portions of the cooled medium from said line to the cooling coil of the dephlegmator on occasion, and a thermostat connected to the gasoline vapors outlet of the dephlegmator for controlling said second pump thereby regulating the temperature of said cooling coil.

In testimony whereof I affix my signature.

JOSEPH PRICE.